June 13, 1967  J. B. OLSSON  3,324,817
MEANS FOR CLOSING OF LARGE OPENINGS, ESPECIALLY
HATCH OPENINGS IN SHIPS
Filed Aug. 23, 1965  3 Sheets-Sheet 1

INVENTOR.
Johan Bertil Olsson
BY
Pierce, Scheffler & Parker
attorneys

June 13, 1967   J. B. OLSSON   3,324,817
MEANS FOR CLOSING OF LARGE OPENINGS, ESPECIALLY
HATCH OPENINGS IN SHIPS
Filed Aug. 23, 1965   3 Sheets-Sheet 2

INVENTOR.
Johan Bertil Olsson
BY
Pierce, Scheffler & Parker
Attorneys

June 13, 1967  J. B. OLSSON  3,324,817
MEANS FOR CLOSING OF LARGE OPENINGS, ESPECIALLY
HATCH OPENINGS IN SHIPS
Filed Aug. 23, 1965  3 Sheets-Sheet 3

INVENTOR.
Johan Bertil Olsson
BY
Pierce, Scheffler & Parker
attorneys

United States Patent Office 3,324,817
Patented June 13, 1967

3,324,817
MEANS FOR CLOSING OF LARGE OPENINGS, ESPECIALLY HATCH OPENINGS IN SHIPS
Johan Bertil Olsson, Goteborg, Sweden, assignor to Aktiebolaget Gotaverken, Goteborg, Sweden, a corporation of Sweden
Filed Aug. 23, 1965, Ser. No. 481,539
Claims priority, application Sweden, Sept. 16, 1964, 11,082/64
4 Claims. (Cl. 114—202)

The present invention refers to means for closing of large openings, especially hatch cover openings in ships, and comprises a number of fittings adapted to co-operate with locking members on the cover sections or on the coaming, respectively. The locking members are designed to be operated simultaneously by means of a common manoeuvring body.

Hitherto known devices of this type are semi or fully automated. In the first case part of the battening down operation is done manually, for instance the attachment of the various fittings. In the latter case the various fittings also when the cover is open remain in a position from which they may be brought to an active position by means of a common manoeuvring body.

Devices of this type are, however, very complicated and expensive to manufacture and they require adjustments and overhaul.

One object of the invention is to obtain a mechanism which is of simple design, absolutely safe in use and which does not require repeated adjustments.

Another object of the invention is to arrange the levers contained in the mechanism in such a manner that in locking position one arm thereof contacts a pertaining locking member on the cover in a vertical downward movement, whereby the usual lateral forces exerted upon the cover by automatic dogging mechanism of known design are avoided.

A further object of the invention is to provide a mechanism for covers arranged flush with the surrounding deck, where the locking mechanism is enclosed.

Another object of the invention is to simplify the assembly work and also to standardize the manufacture. To that end all pertaining parts belonging to one coaming side or to a substantial part thereof are mounted on a beamlike structure already in the workshop, which structure may be fitted to the coaming as a ready made unit.

Figure 1:
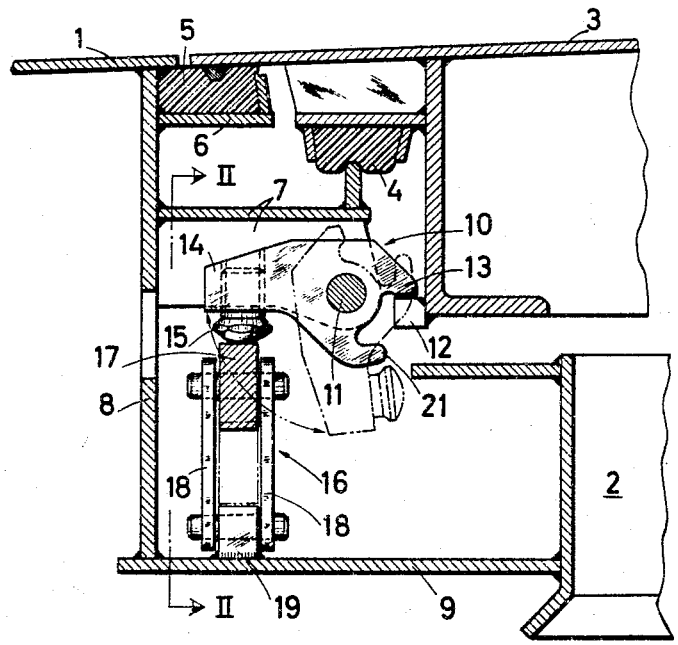
FIGURE 1 shows a section through a flush weather-deck cover.

On the drawing 1 denotes the deck of the ship, 2 the batch opening and 3 a cover section. This rests on double packing strips 4 and 5 carried by channel shaped brackets 6 and 7 fitted to vertical plate members 8 of the coaming. The lower part of these members are designed as a box or shelf 9 and define the hatch opening. The individual fittings in the locking mechanism consists of a two-armed lever 10, which is pivoted on a gudgeon 11 having its axis parallel to the coaming and being carried by the channel bracket 7. A locking member 12 is arranged at the lower edge of the coaming 3 in such a manner that one arm 13 of the lever 10 can co-operate with its top part. The other arm 14 of the lever is provided with an adjustment screw 15, which is adapted to co-operate with a manoeuvring body 16. During displacement parallel to the coaming this body will be raised (or lowered) and a rod 17 or some similar part will turn the levers 10 clockwise in such a manner that the cover section will be forced against the sealings.

The rod 17 is articulatedly connected to the shelf 9 by means of pair of links 18 fitted to lugs 19. The necessary force may be obtained by mechanical means, for instance screws, wedges or the like or by means of a hydraulic ram 20, FIGURE 3, which is fitted between two rods 17.

Figure 2:
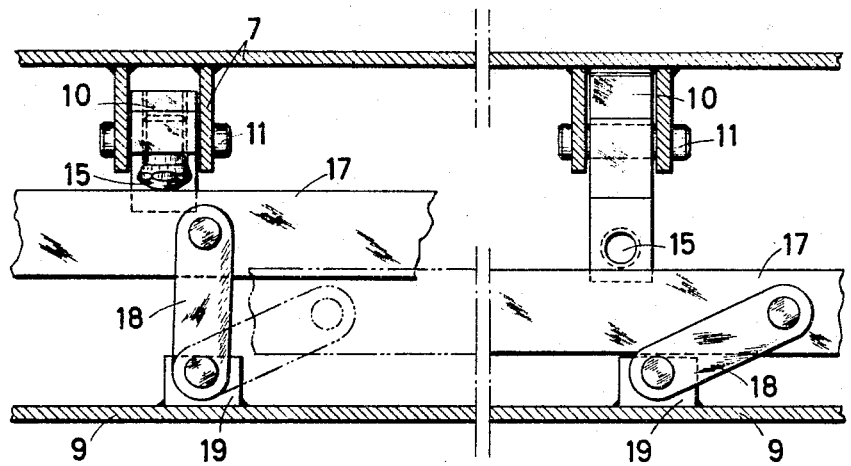
FIGURE 2 shows a section along lines II—II in FIGURE 1, where the left part of the drawing shows the cover in closed position and the right part in un-locked position.

The lever 10 is designed in such a manner that it, when the rod 17 is in un-locked position (right part of FIGURE 2) and the cover is raised, will swing to an upright position due to the weight of arm 14. Arm 13 of the lever 10 is designed as a fork and one prong thereof, 21, is arranged in such a manner that it, when the lever is in its above mentioned upright position, will remain in the path taken by the pertaining locking member during the closing of the cover. The lever is thus not connected to the rod but rests thereon or may be brought to rest thereon during its active period. A lowering of the wheels 22 can be performed simultaneously with the locking operation and during the un-locking a lifting of the wheels may be done. To this end the rod 17 at the actual points is substituted by two parallel rod parts between which filler pieces 23, which fit into the slots 25 in the rails 24, are arranged. Each piece 23 is pivoted about a gudgeon 26 and is provided with a guiding surface 27 designed for co-operation with a member 28, for instance a roller or the like, arranged between or below the parallel rod parts 17. A movement of the rods 17 parallel to the coaming and a simultaneous raising brings about a turning of the filler pieces in relation to the gudgeons 26. A wheel 22 of the cover being above a slot in the rails will thereby be raised or lowered.

Figure 3:
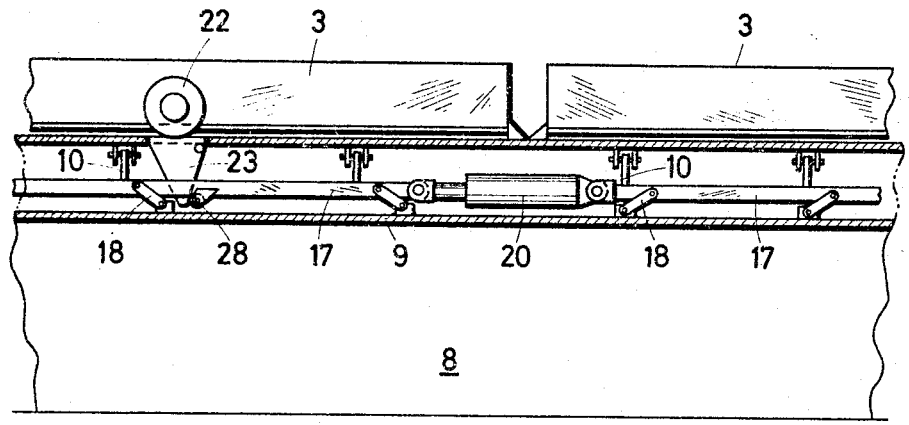
FIGURE 3 shows partly in section a side view of a conventional weather deck cover with raised coaming, where the wheels of the cover in locked position are partly sunk into slots in the rails.
Figure 4:
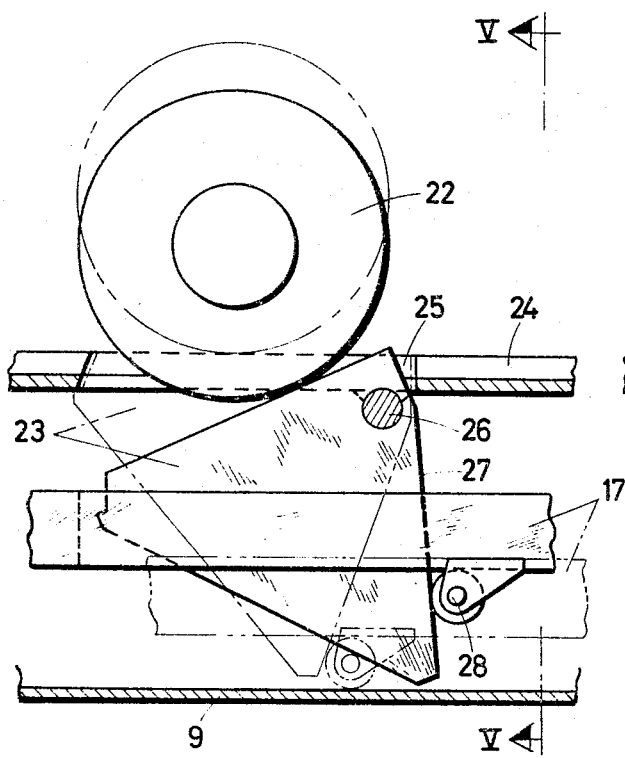
FIGURE 4 shows in section and on a larger scale the means for raising and lowering said wheels in relation to the coaming.
Figure 5:
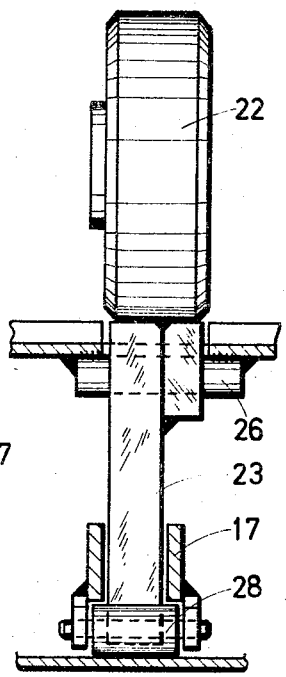
FIGURE 5 is a section along line V—V in FIGURE 4.

The mechanism works in the following manner, it being presupposed that the manoeuvring occurs hydraulically by means of the ram shown in FIGURE 3. When the sections have been lowered unto the coaming the hydraulic ram 20 is actuated and the rods 17 connected to the cylinder and to the piston therein, respectively, are moved towards each other. Hereby the links 18 are raised which brings about a raising also of the rods 17. Owing to the movements of the rods parallel to the coaming towards the hydraulic cylinder 20 the filler pieces 23 will be swung downwards, which means that the section will be lowered unto the sealing strips.

The raising of rods 17 also brings about a turning of the levers 10, which force the cover against the coaming. The pressure acting aaginst the sealing strips may be adjusted by means of the screw 15. Such adjustment has to be done only to compensate for possible wear of the sealings. The un-locking is performed in the same manner as above described but in the reverse order, that is the hydraulic ram 20 forces the piston and cylinder outwards whereby the rods are lowered, the pressure on the cover is released and a lifting of the wheels is brought about.

Figure 6:
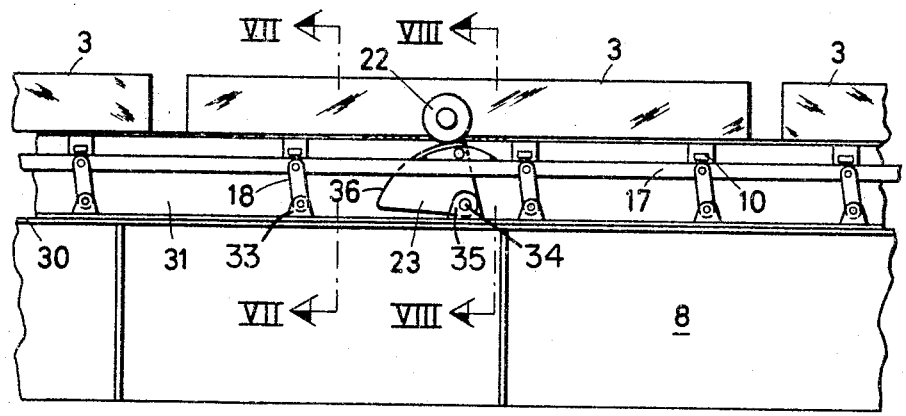
FIGURE 6 shows a detail of a weather deck cover of slightly modified design.
Figure 7:
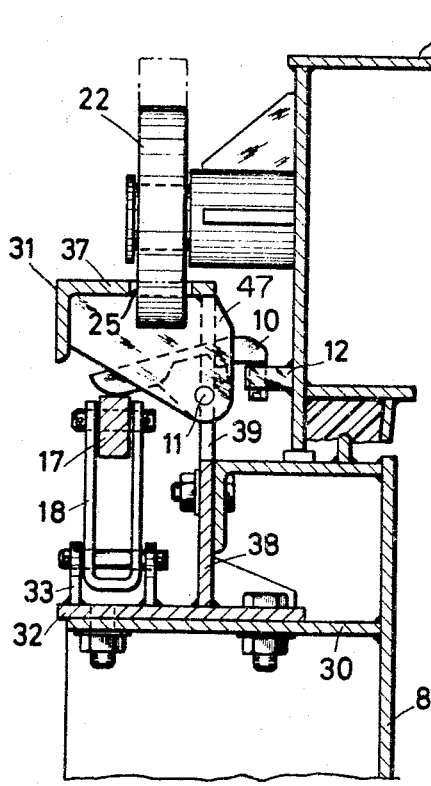
FIGURE 7 is a section along line VII—VII in FIGURE 6.
Figure 8:
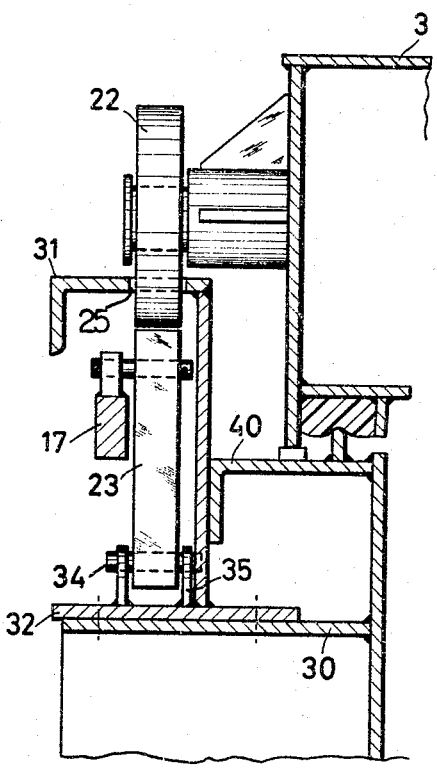
FIGURE 8 shows a section along line VIII—VIII in FIGURE 6.

A modified embodiment is shown on FIGURES 6–8, illustrating a weather deck cover. The coaming 8 is provided with a bracket 30 and possibly also with an extra support 40 consisting of an L-bar at some distance from and at right angles to the bracket. The locking members 10, the filler pieces 23 for lifting the cover sections 8 from the coaming as well as the manoeuvring body for actuating said parts are arranged in a detachable beam 31, which is carried by the bracket 30. The beam 31 has a U-shaped cross-section and one flange 32, thereof carries the manoeuvring body 17. This consists of a rod 17, which by means of links 18 is articulatedly connected to lugs 33 fitted to said flange 32. Each filler piece is journalled on a gudgeon 34, which is carried by lugs 35 also fitted to flange 32. The filler pieces are further connected to rod 17 in such a manner that a displacement thereof in the horizontal direction and parallel to the coaming will bring about a turning movement of the pieces with respect to gudgeons 34. A guiding surface 36 on each piece will then cooperate with a superimposed wheel 22, which when the cover 3 is in closed position fits into a slot 25 in the other flange 37 of the beam. An aperture 39 is provided in the web portion 38 of the beam for each locking member 10. Each member consists of a two armed lever, which is journalled on a gudgeon 11 carried by lugs 41. These members are arranged in such a manner with respect to the manoeuvring rod 17 that one arm of the lever 10 is actuated when the rod is displaced in a horizontal upwards movement. A locking member 12 is arranged at the cover section 3 opposite each lever. The outside of flange 37 of the beam is designed to act as runway for the wheels 22 and is provided with the slots 25, above mentioned, into which the filler pieces 23 are working.

The beam 31 is preferably bolted to bracket 30 and L-bar 40 of the coaming but may of course be detachably fixed thereto in arbitrary manner. The advantages of detachable beams according to the invention are that the mounting and the adjustment of the fittings and other parts can be performed in the workshops and that the moving parts are better protected than in the old designs where the individual fittings were attached directly to the coaming. The beam with the fitting may be made as standardized units applicable to different types of covers.

What I claim is:

1. Means for closing of large openings surrounded by a coaming comprising cover sections adapted, when in closed position, to rest on said coaming and be latched thereto by means of a number of fittings at the coaming, said fittings containing levers designed to be operated simultaneously by means of a manoeuvring body displaceable along the coaming to make several levers engage juxtaposed locking members at the cover section
    gudgeon pins having their respective axis parallel to the pertaining side of the coaming for carrying the levers intermediate their ends to make each lever tow-armed with a first and a second arm part, said first arm part being heavier than the second arm part, whereby the lever when in inactive position occupies an essentially upright position,
    and links to connect the manoeuvring body to the coaming in such a manner that it during movement along the coaming will also be displaced in the horizontal direction, thereby when moving towards locking position lifting the first arm parts of the levers and bringing the second arm parts thereof to engage juxtaposed locking members in a vertical downward movement.

2. Means for closing of large openings surrounded by a coaming comprising cover sections adapted, when in closed position, to rest on said coaming and be latched thereto by means of a number of fittings at the coaming, said fittings containing levers designed to be operated simultaneously by means of a manoeuvring body displaceable along the coaming to make several levers engage juxtoposed locking members at the cover section.
    gudgeon pins having their respective axis parallel to the pertaining side of the coaming for carrying the levers intermediate their ends to make each lever two-armed with a first and a second arm part, said first arm part being heavier than the second arm part whereby the lever in inactive position will occupy an essentially upright position,
    links to connect the manoeuvring body to the coaming lower than and outside of said gudgeon pins in such a manner that the body during movement along the coaming will also be displaced in the horizontal direction, thereby when moving towards locking position lifting the first arm parts of the levers,
    a first fork prong at said second arm parts to engage juxtaposed locking member in a vertical downward movement,
    and a second fork prong at the same arm part devised in such a manner that it when the lever rests in upright position will extend into the path taken by the corresponding locking member during the closing movement of the cover, to lift the first arm parts into position for engagement by the manoeuvring body.

3. Means for closing of large openings surrounded by a coaming comprising wheel carried cover sections adapted, when in closed position, to rest on said coaming and be latched thereto by means of a number of fittings at the coaming said fittings containing levers designed to be operated simultaneously by means of a manoeuvring body displaceable along the coaming to make several levers engage juxtaposed locking members at the cover section; a bracket member fixed to said coaming; an angle beam structure detachably mounted to the bracket member on said coaming, said detachable mounted structure including an angle beam;
    gudgeon pins fitted to said beam for carrying the levers,
    a horizontal flange in said angle beam structure acting as runway for the cover carrying wheels,
    slots in said horizontal flange adapted to receive the wheels when the cover is in closed position,
    filler pieces pivotally mounted to the angle beam structure close by the slots for lifting the wheels out of the slots,
    and links to connect the manoeuvring body to said angle beam structure in such a manner that said body will simultaneously actuate the levers and the filling pieces.

4. Means according to claim 3 in which said angle beam structure has a general U-shaped cross-section with a vertical web part and horizontal upper and lower flanges, the gudgeon pins being attached to the web portion, the upper flange being the aforesaid horizontal flange acting as runway
    and the manouevring body being attached to the lower flange.

References Cited
UNITED STATES PATENTS

| | | | |
|---|---|---|---|
| 1,531,487 | 3/1925 | Lundberg | 292—49 |
| 3,155,068 | 11/1964 | Kummerman | 114—203 |

MILTON BUCHLER, *Primary Examiner.*

ANDREW H. FARRELL, *Examiner.*